Figure 1:
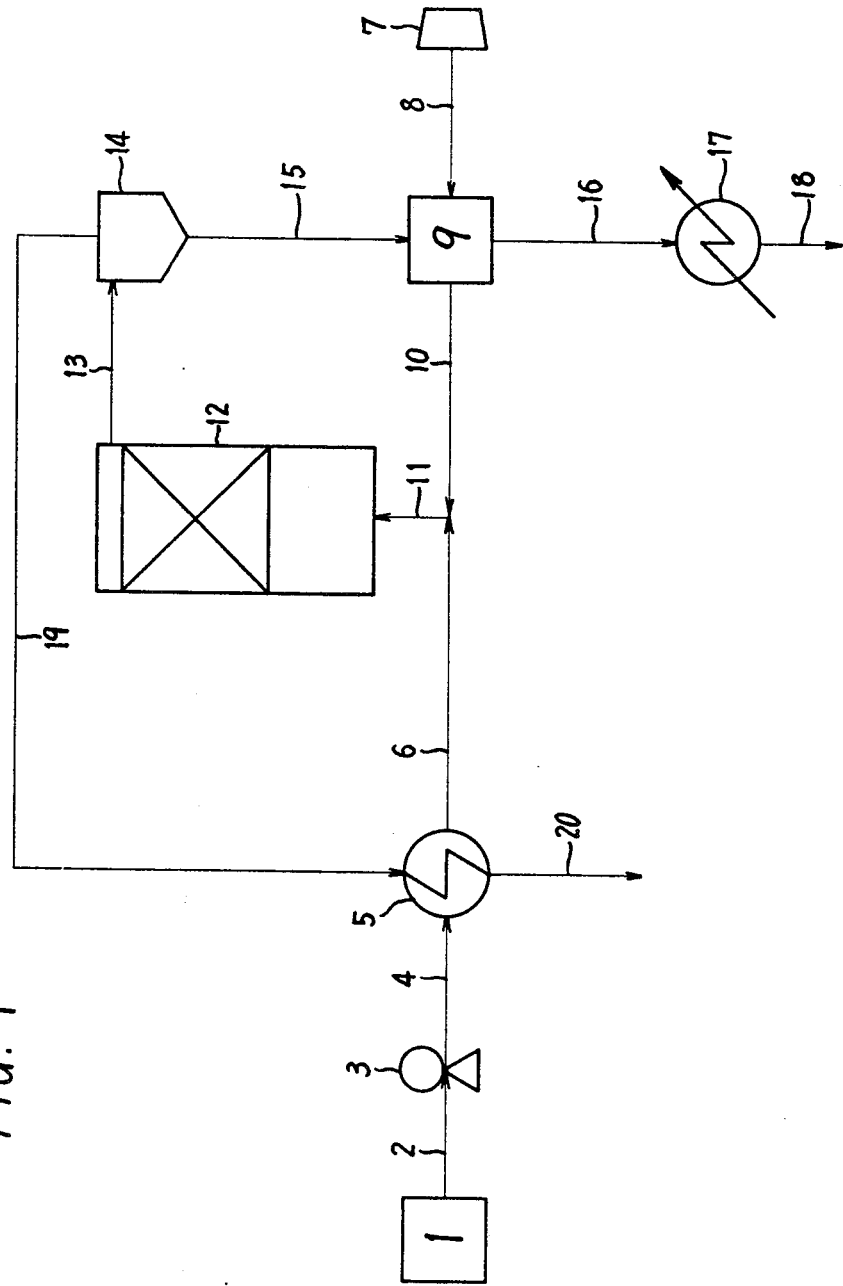

United States Patent [19]

Okada et al.

[11] 4,141,828
[45] Feb. 27, 1979

[54] PROCESS FOR TREATING WASTE WATER

[75] Inventors: Nobuhiko Okada; Yoichi Nakanishi; Yoshiaki Harada, all of Osaka, Japan

[73] Assignee: Osaka Gas Company, Limited, Osaka, Japan

[21] Appl. No.: 823,496

[22] Filed: Aug. 10, 1977

[30] Foreign Application Priority Data

Aug. 10, 1976 [JP] Japan .................... 51-95507

[51] Int. Cl.² ..................... C02B 1/34; C02C 5/04
[52] U.S. Cl. ..................... 210/63 R; 210/DIG. 28
[58] Field of Search ................ 210/63 R, DIG. 28

[56] References Cited

U.S. PATENT DOCUMENTS

| | | | |
|---|---|---|---|
| 2,665,249 | 1/1954 | Zimmermann | 210/2 |
| 3,804,756 | 4/1974 | Callahan et al. | 210/63 R |
| 3,912,626 | 10/1975 | Ely et al. | 210/63 R |
| 4,052,302 | 10/1977 | Fletcher et al. | 210/63 R |
| 4,070,281 | 1/1978 | Tagashira et al. | 210/63 R |
| 4,072,608 | 2/1978 | Forha et al. | 210/63 R |

FOREIGN PATENT DOCUMENTS 2425587  12/1974 Fed. Rep. of Germany ........ 210/63 R

OTHER PUBLICATIONS

Schatzberg et al., "Experimental Investigation of the Wet Oxidation Destruction of Shipboard Waste Streams", ASME Pub. No. 74-ENAs-5, Aug., 1974.
Choulat, "Verfahren fur die Autarbeitung des in Kokereien und Gaswerksunlagen anfallenden Ammoniakrohwassers", gwf GAS, Feb., 1964.

Primary Examiner—Thomas G. Wyse
Attorney, Agent, or Firm—Larson, Taylor and Hinds

[57] ABSTRACT

A process for treating ammonia-containing waste water which comprises subjecting the ammonia-containing waste water to wet oxidation with an oxygen-containing gas in the presence of a catalyst while maintaining the waste water at a temperature of 100 to 370° C. and at pressure permitting the waste water to remain in the liquid phase, the catalyst comprising at least one of iron, cobalt, nickel, ruthenium, rhodium, palladium, iridium, platinum, copper, gold, tungsten and water-insoluble compounds thereof.

13 Claims, 2 Drawing Figures

PROCESS FOR TREATING WASTE WATER

This invention relates to a process by which waste water containing ammonia or chemically oxidizable substances (hereinafter referred to as "COD components"), suspended solids, etc. in addition to ammonia is subjected to wet oxidation in the presence of a catalyst to convert these pollutants to nitrogen, carbon dioxide, water and the like and to thereby render the waste water harmless.

According to this invention, the ammonia contained in the waste water includes ammonium compounds which liberate ammonium ions when dissociated in water. The COD components include phenol, cyanides, thiocyanides, oils, etc.

For the control of water pollution, it is thought necessary in recent years to remove from water nitrogen components (particularly ammonia nitrogen) as well as COD components. The former serves as nutrients contributing chiefly to an abnormal growth of algae in rivers and lakes, occurrence of red tide in the sea, and occurrence of molds in reservoirs which renders municipal water musty. Thus more stringent regulations will be adopted against nitrogen pollutants. It is known to remove ammonia from water by the air stripping process, distillation process, selective ion exchange process with use of ion exchange resin, chemical oxidation process, biological oxidation process, reverse osmosis process, electrochemical process, etc. However, these processes have at least one of the drawbacks of being complex and costly to practice, involving limitations on the ammonia concentration of the water to be treated and requiring an additional treatment. Various problems are therefore encountered in practicing such processes on a commercial scale. The known ammonia removing processes are further almost ineffective in removing pollutants such as COD components and suspended solids which are contained in waste water conjointly with ammonia. In fact, the processes are feasible only when these pollutants are contained in low concentrations.

On the other hans, processes for treating COD components include the activated sludge process and coagulation and sedimentation process which are widely adopted. Also known are more sophisticated processes such as the reverse osmosis process, chlorine process, active carbon process, etc. Although suitable for treating waste water of relatively low COD, these processes are not very useful for removing ammonia of high concentrations and have various other drawbacks. For example, the activated sludge process requires a prolonged period of time for the decomposition of COD components and involves the need to dilute waste water to a concentration suited to the growth of bacteria, thus necessitating a wide area for the installation of the treating plant. The reverse osmosis process has been introduced into use for the desalination of seawater and industrial water as well as for high-degree purification of municipal water, but many problems such as the membrane life and method of treating the resulting concentrate still remain to be solved for its application to waste water. The active carbon process, which is useful for the removal of low-molecular-weight organic COD components such as benzene and toluene, is inefficient in removing high-molecular-weight organic COD components and is not satisfactorily applicable to waste water containing tar-like high-molecular-weight substances which will cover the surface of the active carbon particles or inorganic COD components which are not readily adsorbable by the active carbon.

Another process termed the Zimmermann process is known for treating waste water containing COD components in relatively high concentrations by oxidizing the waste water for decomposition at a high temperature and high pressure. This process involves a low reaction efficiency and permits the ammonia in the waste water to remain substantially free of decomposition, so that the treated waste water must be further subjected to another step of removing COD components and ammonia before disposal.

Accordingly, an object of this invention is to provide a process for effectively treating waste water containing nitrogen, especially ammonia nitrogen, on a commercial scale.

Another object of this invention is to provide a process for effectively treating waste water containing COD components, suspended solids, etc. in addition to ammonia nitrogen.

Other objects and features of this invention will become apparent from the following description.

This invention provides a process for treating ammonia-containing waste water comprising subjecting the ammonia-containing waste water to wet oxidation with an oxygen-containing gas in the presence of a catalyst while maintaining the waste water at a temperature of 100° to 370° C. and at pressure permitting the waste water to remain in the liquid phase, the catalyst comprising at least one of iron, cobalt, nickel, ruthenium, rhodium, palladium, iridium, platinum, copper, gold, tungsten and compounds of these metals which are insoluble in water.

In view of the existing techniques for treating ammonia-containing waste water described above, we have carried out extensive research to develop a process for treating waste water with ease and with economical feasibility which process is capable of removing ammonia or, when desired, ammonia and COD components at the same time, even when the concentration of ammonia is as high as up to about 20,000 ppm. As a result, we have found that this object can be achieved by subjecting waste water to reaction in the presence of a specific catalyst and under specified conditions. Thus this invention has been accomplished.

Examples of the waste water to be treated by the present process are those which contain ammonia and which may further contain oxidizable organic and/or inorganic substances, such as gas liquor produced in coke oven plants, waste water from gas cleaning process, oil-containing waste water, water from activated sludge process, sedimented activated sludge, waste water from chemical plants and oil refineries, municipal effluents, sewage, sewage sludge, etc. If the waste water contains an excess of suspended solids, the solids will adhere to the components of the treating apparatus, entailing a reduced efficiency such as a reduced heat transfer coefficient on the surface of the heat exchanger or a lower catalytic activity due to the deposition of solids on the surface of particles of the catalyst packed in the reactor. Accordingly, it is preferable to remove suspended solids partly or wholly from the waste water prior to the treatment depending on the concentration and composition of the solids. The waste water to be treated by the present process has preferably a pH of at least 9 so as to remove COD components and ammonia effectively. More preferable range of the pH is about 10 to 12.5. It is therefore desirable to adjust the pH of the waste water before or during the reaction with an alkali such as sodium hydroxide, calcium hydroxide, sodium carbonate or the like depending on the kind of the waste water.

Examples of useful active components of catalysts are iron, cobalt, nickel, ruthenium, rhodium, palladium, iridium, platinum, copper, gold and tungsten and compounds of these metals which are insoluble in water. These components are used singly, or at least two of them are conjointly usable. Examples of useful compounds which are insoluble in water are:

(i) Oxides such as iron sesquioxide, tri-iron tetroxide, cobalt monoxide, nickel monoxide, ruthenium dioxide, rhodium sesquioxide, palladium monoxide, iridium dioxide, cupric oxide, tungsten dioxide, etc.

(ii) Chlorides such as ruthenium trichloride, platinum dichloride, etc.

(iii) Sulfides such as ruthenium sulfide, rhodium sulfide, etc.

These metals and compounds thereof are used as supported in the usual manner by a carrier such as alumina, silica, silica-alumina, active carbon or the like. The amount of the active component to be supported by the carrier is 0.05 to 25%, preferably 0.5 to 3%, based on the weight of the carrier. The catalyst can be used in the form of globules, pellets, cylinders, crushed fragments, particles or in any other desired form. When a reactor with a fixed bed is used, the retention time of waste water in the reactor is generally for 15 to 90 minutes. The grains or pieces of the supported catalyst useful for the fixed bed is usually about 3 to about 50 mm, preferably about 5 to about 25 mm in size. In the case of fluidized beds, it is preferable to use the supported catalyst as suspended in the waste water like a slurry in such an amount that it will form a fluidized bed within the reactor, namely in an amount of usually 0.1 to 20% by weight, more preferably 0.5 to 10% by weight, based on the resulting suspension. For the actual operation with the fluidized bed, it is preferable to feed the supported catalyst to the reactor as suspended in the waste water, separate the catalyst from the treated water resulting from the reaction by sedimentation, centrifuging or like suitable method and reuse the separated catalyst again. To facilitate the separation of the catalyst from the treated water, therefore, the supported catalyst useful for the fluidized bed is advantageously about 0.15 to about 0.5 mm in particle size.

Examples of useful oxygen-containing gases are air, oxygen-enriched air, oxygen, oxygen-containing waste gases, etc. By the oxygen-containing waste gases are meant those having a lower oxygen concentration than air and containing one or more of hydrogen cyanide, hydrogen sulfide, ammonia, sulfur dioxide, organic sulfur compounds, nitrogen oxides, hydrocarbons, etc., such as a waste gas from the regenerator of the redox desulfurization process. The use of such oxygen-containing waste gases is advantageous in that the harmful components of the gas can be rendered harmless along with those contained in the waste water. The feed rate of the oxygen-containing gas is determinable from the theoretical amount of oxygen required for the oxidation of the organic and/or inorganic substances in the waste water and for the decomposition of ammonia to nitrogen. Generally, the oxygen-containing gas is fed in an amount of 1 to 1.5 times, preferably 1.05 to 1.2 times the theoretical amount of oxygen.

The reaction is carried out at a temperature of usually 100° to 370° C., preferably 250° to 320° C. The higher the reaction temperature, the higher the efficiency of removal of ammonia, organic and/or inorganic substances and the shorter the residence time of the waste water within the reactor but the higher the equipment cost. Accordingly, the reaction temperature is determined in view of the kind of the waste water, the degree of treatment desired and operation and installation costs combined. The reaction pressure therefore needs only to be such that the waste water can at least retain its liquid phase at the predetermined temperature.

Figure 2:
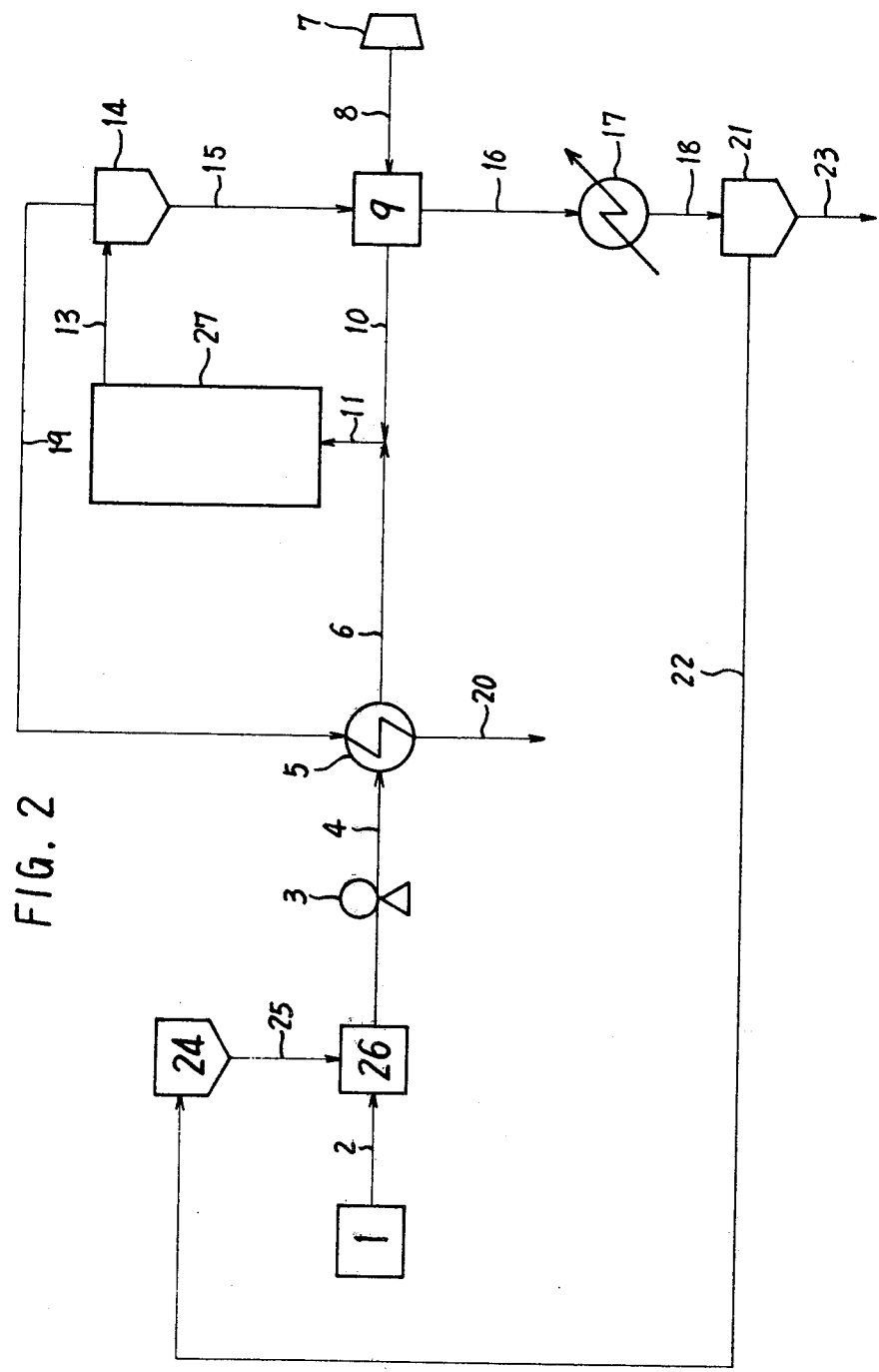

This invention will be described below in greater detail with reference to the accompanying drawings, in which:

FIG. 1 is a diagram illustrating one mode of the process of this invention in which a fixed bed is used; and FIG. 2 is a diagram illustrating another mode of the present process in which a fluidized bed is used.

Throughout FIGS. 1 and 2, like parts are referred to by like reference numerals.

With reference to FIG. 1, waste water is supplied from a tank 1 through a line 2 to a pump 3, by which the water is pressurized to a predetermined pressure level. The water is then led through a line 4, a heat exchanger 5 and a line 6, mixed with an oxygen-containing gas and admitted via a line 11 to a reactor 12 filled with a catalyst. As already described, the pH of the waste water is adjusted with an alkali depending on the kind of the waste water. The alkali can be added to the water at one or more portions of the tank 1, lines 2, 4, 6, 11 and reactor 12.

The oxygen-containing gas, pressurized by a compressor 7, is passed through a line 8, a humidifier 9 and a line 10, mixed with the waste water as stated above and fed to the reactor 12 through the line 11. It is preferable, but not critical, to use the humidifier which serves to prevent the evaporation of the water within the reactor and to achieve an improved heat recovery efficiency. For an improved liquid-gas contact efficiency and increased reaction efficiency in the reactor 12, it is advantageous to finely divide the gas bubbles in the stream of mixed water and gas. Methods of dividing such bubbles are disclosed for example in Japanese Patent Application Disclosures No. 49873/1974 and No. 49874/1974 incorporated by reference herein.

The oxygen-containing gas may be added to the waste water at the outlet of the pump 3 or partially introduced directly into the reactor 12 at a single level or as divided at two or more levels. When required, the waste water may be heated at the line 6 or at a lower portion of the reactor 12. However, when the required amount of heat can be provided by the heat of reaction, the waste water need not be heated. When heating is resorted to, the waste water, while flowing through the line 6, may be heated in an unillustrated oven or by heat exchange with a heat medium. Alternatively, the water may be subjected to heat exchange with a heat medium at a lower portion of the reactor.

After the waste water has reacted with the oxygen in the gas under the specified conditions within the reactor 12, the resulting mixture is run off from an upper portion of the reactor 12 through a line 13 and conducted to a liquid-gas separation drum 14, in which the mixture is separated into a gas and a liquid.

The treated water flowing out from the separation drum 14 is admitted to the humidifier 9 by way of a line 15, partly entrained in the oxygen-containing gas and sent to the reactor 12 through the lines 10 and 11. The remainder of the treated water drawn off from the humidifier 9 is passed through a line 16 to a cooler 17, cooled and decompressed to the atmospheric pressure and is released from a line 18.

The gas egressing from the separation drum 14 is sent through a line 19 to the heat exchanger 5, in which the gas gives heat to the waste water, then decompressed to the atmospheric pressure and run off through a line 20.

Alternatively, the liquid-gas mixture drawn off from the reactor 12 may be held directly to the heat exchanger 5 and thereafter separated into a gas and a liquid in the separation drum 14. The liquid is released from the line 18 and the gas to atmosphere through the line 20.

With reference to FIG. 2, waste water is sent from a tank 1 into a mixer tank 26, in which the water is mixed with a catalyst from a container 24 into a slurry. The slurry is pressurized to a predetermined pressure level by a pump 3 and, in the same manner as in FIG. 1, is thereafter led through a line 4, a heat exchanger 5 and lines 6, 11 to a reactor 27 containing no catalyst. An oxygen-containing gas may usually be fed to the reactor in the same manner as in FIG. 1. To fluidize the slurry to a greater extent, part of the gas can be fed directly to the reactor 27 via at least one line branching from a line 10. The treated water containing the catalyst is sent through a line 13, liquid-gas separator 14, line 15, humidifier 9, line 16, cooler 17 and line 18 to a liquid-solid separator 21 such as hydrocyclone. The separated liquid is drawn off via a line 23, while the catalyst recovered is returned through a line 22 to the container 24 and circulated for use.

The waste water treated by the process of this invention contains little or no ammonia or COD components, or the concentrations thereof have been reduced to such an extent that the treated water is disposable. Furthermore, the gas and the liquid separated after the treatment are substantially free from nitrogen oxides. The treated water appears almost colorless and transparent and is very advantageously reusable for example for industrial applications as it is or when further treated by the reverse osmosis process if the water contains sodium sulfate or the like derived from sulfur compounds.

In contrast with the present process, known processes require many steps and are costly. For example, the gas liquor produced in coke ovens in the manufacture of coke is usually treated by the successive steps of (1) removal of phenol, (2) pretreatment, (3) removal of ammonia by stripping, (4) treatment with activated sludge and (5) coagulation and sedimentation, which may further be followed by the steps of (6) oxidation with chemical, (7) adsorption with active carbon and (8) reverse osmosis, when required. The process of this invention consists essentially of a single step in which the gas liquor from the coke oven is fed directly to a reactor on pressurization without being cooled and catalytically oxidized with an oxygen-containing gas, whereby the ammonia and COD components (such as phenol, cyanides, thiocyanides, oils, thiosulfuric acid, sulfurous acid, sulfides, etc.) contained in the gas liquor can all be decomposed and rendered harmless. Thus the present process involves a greatly simplified operation which can be conducted at an exceedingly reduced overall cost (equipment cost and operation cost).

This invention will be described below more specifically with reference to Examples.

EXAMPLES 1 to 10

Into a 300-ml autoclave equipped with an electromagnetic induction stirrer are placed 150 ml of an aqueous solution of ammonium chloride (ammonia: 2500 ppm in concentration, 0.375 g in amount), 5 g of a catalyst (0.15 to 0.25 mm in particle size) listed in Table 1 and an amount of sodium hydroxide solution required to adjust the pH of the solution to 12. The autoclave is then closed.

Subsequently, 2,650 ml (under standard conditions) of air is introduced into the autoclave to an internal pressure of 18 kg/cm$^2$ G. The mixture in the autoclave is then heated to 270° C. over a period of 30 minutes, maintained at 270° C. for one hour with stirring at 750 r.p.m. and thereafter cooled by a fan. The gas from the autoclave is passed through a N/10 absorbing solution of sulfuric acid and a wet-type meter to measure the quantities of the gas and ammonia. The absolute amount of the ammonia remaining in the gas phase is calculated from the results.

The catalyst is separated from the liquid by filtration. The concentration of ammonia in the liquid is measured by Indophenol blue method.

Ammonia decomposition percentage is calculated from the combined amount of ammonia remaining after the reaction relative to the amount of ammonia charged.

The above procedure is repeated for all the catalysts listed in Table 1, which also shows the results.

Comparison Example 1

The same procedure as in Example 1 is repeated without using any catalyst. The result is given in Table 1.

Table 1

| Example | Catalyst | Ammonia decomposition (%) |
|---|---|---|
| Ex. 1 | 2% Ru-$\gamma$Al$_2$O$_3$ | At least 99 |
| Ex. 2 | 2% Ir-$\gamma$Al$_2$O$_3$ | At least 99 |
| Ex. 3 | 2% Pt-$\gamma$Al$_2$O$_3$ | 95 |
| Ex. 4 | 2% Pd-$\gamma$Al$_2$O$_3$ | 93 |
| Ex. 5 | 2% Rh-$\gamma$Al$_2$O$_3$ | 92 |
| Ex. 6 | 2% Au-$\gamma$Al$_2$O$_3$ | 93 |
| Ex. 7 | 2% Pd-active carbon | 93 |
| Ex. 8 | 2% Pt-active carbon | 96 |
| Ex. 9 | 2% RuCl$_3$-$\gamma$Al$_2$O$_3$ | 96 |
| Ex. 10 | 2% RuO$_2$-$\gamma$Al$_2$O$_3$ | 93 |
| Comp. Ex. 1 | — | 12 |

EXAMPLE 11

Into the same autoclave as used in Example 1 are placed 150 ml of waste water (quality shown in Table 2) collected at the inlet of an apparatus for the activated sludge process and 2 g of a catalyst (0.15 to 0.25 mm) containing 0.5% of ruthenium supported by $\gamma$-alumina and an amount of calcium hydroxide required for adjusting the pH of the waste water to 12. The concentration of ammonia in the waste water is adjusted with ammonia water. The reaction temperature is 290° C. With these exceptions, the same procedure as in Example 1 is repeated. Table 2 shows the results.

Comparison Example 2

The same waste water as used in Example 11 is subjected to the activated sludge process with the result also given in Table 2.

Table 2

| Waste water | COD | Total $NH_3$ | Phenol | Total CN | Thiocyan-ide | Suspended Solids |
|---|---|---|---|---|---|---|
| Before treatment Concn. (ppm) | 750 | 1650 | 180 | 25 | 60 | 25 |
| After treatment (Ex. 11) | | | | | | |
| Concn. (ppm) | 4 | 5 | Trace | Trace | Trace | Trace |
| Removal (%) | 99.5 | 99.7 | 99.9 | 99.9 | 99.9 | 99.9 |
| After treatment (Comp. Ex. 2) | | | | | | |
| Concn. (ppm) | 83 | 1640 | 0.2 | 2.4 | 46 | 45 |
| Removal (%) | 88.9 | 0.6 | 99.9 | 90.4 | 23.3 | — |

EXAMPLE 12

The process of this invention is practiced in the mode shown in FIG. 1.

A gas liquor obtained from a coke oven is adjusted to a pH of 12.5 with a sodium hydroxide solution and fed to a lower portion of a cylindrical stainless steel reactor at a space velocity of 0.99 hr$^{-1}$ (based on an empty column). The mass velocity of the liquor is 3.45 t/m$^2$.hr. Air is introduced into the lower portion of the reactor at a space velocity of 44.1 hr$^{-1}$ (based on an empty column, under standard conditions). The reactor is filled with a catalyst in the form of pellets 6 mm in diameter and composed of 2.0% by weight of ruthenium supported on alumina. The interior of the reactor is maintained at a temperature of 265° C. and pressure of 70 kg/cm$^2$ G. The liquid-gas mixture resulting from the catalytic reaction is continuously drawn off from an upper portion of the reactor, indirectly cooled and then led to a liquid-gas separator. Table 3 shows the removal efficiency calculated from the absolute amount of each component remaining in the separated gas phase and liquid phase. JIS in Table 3 is the abbreviation for Japanese Industrial Standard.

EXAMPLE 13

The same procedure as in Example 12 is repeated except that the internal temperature and pressure of the reactor are 250° C. and 60 kg/cm$^2$ G.

Table 3

| | Example 12 Removal(%) | Example 13 Removal(%) | Method of analysis |
|---|---|---|---|
| COD | At least 99 | 99 | JIS K 0102-1974 |
| Total $NH_3$ | At least 99 | At least 99 | " |
| Phenol | 99 | 99 | " |
| Total CN$^-$ | 98 | 97 | " |
| SCN$^-$ | At least 99 | 98 | Ferric chloride colorimetry |
| Suspended Solids | 98 | 98 | JIS K 0102-1974 |
| $S_2O_3^-$ | 99 | 95 | Determined from iodine consumption |
| $SO_3^-$ | 97 | 95 | JIS K 0102-1974 |
| $H_2S$ | At least 99 | 98 | Determined from iodine consumption |
| n-Hexane extract | 98 | 95 | JIS K 0102-1974 |
| Appearance | Change from blackish brown to light yellow (Almost no odor) | Change from blackish brown to light yellow (Almost no odor) | " |
| Transparency | Change from 25% to 92% | Change from 25% to 90% | Colorimetry |
| TOD | At least 99 | At least 99 | JIS K 0102-1974 TOD—TC analyser |
| TC | 85 | 75 | JIS K 0102-1974 TOD—TC analyser |
| TN | 99 | 99 | Nitrogen analyser |

Note:
TOD stands for total oxygen demand, TC for total carbon, and TN for total nitrogen, the same as hereinafter.

EXAMPLE 14

The same procedure as in Example 12 is repeated except that gas liquors of varying pH values are fed to the reactor. Table 4 shows the ammonia removal efficiency at each pH value.

Table 4

| | pH | Ammonia removal (%) |
|---|---|---|
| (1) | 8 | 80 |
| (2) | 9 | 90 |
| (3) | 10 | 99 |
| (4) | 11 | At least 99 |
| (5) | 12 | At least 99 |
| (6) | 13 | At least 99 |

EXAMPLE 15

The same procedure as in Example 12 is repeated except that the temperature and pressure within the reactor are altered variously. Table 5 shows the ammonia removal efficiencies achieved under varying conditions.

Table 5

| | Temperature (° C) | Pressure (kg/cm$^2$G) | Ammonia removal(%) |
|---|---|---|---|
| (1) | 150 | 25 | 40 |
| (2) | 250 | 60 | At least 99 |
| (3) | 290 | 100 | At least 99 |
| (4) | 325 | 125 | At least 99 |

EXAMPLES 16 to 34

The same procedure as in Example 12 is repeated except that the catalysts listed in Table 6 are used. Table 6 also shows COD removal efficiencies and ammonia removal efficiencies.

Table 6

| Example | Catalyst | COD removal (%) | Ammonia removal (%) |
|---|---|---|---|
| 16 | 1.0% Ir—$Al_2O_3$ | 99 | At least 99 |
| 17 | 1.0% Pt—$Al_2O_3$ | 99 | 99 |
| 18 | 1.0% Au—$Al_2O_3$ | 98 | 98 |
| 19 | 1.0% Pd—$Al_2O_3$ | 98 | 98 |
| 20 | 1.0% Rh—$Al_2O_3$ | 98 | 98 |
| 21 | 5.0% Fe—$Al_2O_3$ | 95 | 95 |
| 22 | 5.0% Ni—$Al_2O_3$ | 90 | 95 |
| 23 | 5.0% W—$Al_2O_3$ | 90 | 89 |
| 24 | 5.0% Cu—$Al_2O_3$ | 90 | 90 |
| 25 | 5.0% Co—$Al_2O_3$ | 92 | 93 |
| 26 | 5% $Fe_2O_3$—$Al_2O_3$ | 85 | 89 |
| 27 | 5% $Fe_3O_4$—$Al_2O_3$ | 80 | 85 |
| 28 | 5% CoO—$Al_2O_3$ | 95 | 95 |
| 29 | 5% NiO—$Al_2O_3$ | 85 | 80 |
| 30 | 5% $Rh_2O_3$—$Al_2O_3$ | 90 | 90 |
| 31 | 5% PdO—$Al_2O_3$ | 90 | 95 |
| 32 | 5% $IrO_2$—$Al_2O_3$ | 95 | 97 |
| 33 | 5% CuO—$Al_2O_3$ | 90 | 97 |
| 34 | 5% $WO_2$—$Al_2O_3$ | 85 | 70 |

EXAMPLE 35

The process of this invention is practiced in the mode shown in FIG. 2.

A catalyst in the form of particles 0.15 to 0.3 mm in size and composed of 5% by weight of ruthenium supported on alumina is added to a gas liquor from a coke oven containing phenol, ammonium thiocyanate, ammonium thiosulfate, ammonium nitrite, ammonium nitrate, ammonium carbonate and ammonia to prepare a slurry having a catalyst concentration of 10% by weight. The pH of the slurry is adjusted to 12 with sodium hydroxide. The slurry is fed to a cylindrical stainless steel reactor at a space velocity of 1.51 hr$^{-1}$ (based on an empty column) and a mass velocity of 4.53 t/m$^2$.hr, while air is introduced into the reactor at a space velocity of 90.5 hr$^{-1}$ (based on an empty column, under standard conditions). The interior of the reactor is maintained at a temperature of 250° C. and pressure of 60 kg/cm$^2$ G. The liquid-gas mixture resulting from the catalytic reaction is continuously drawn off from an upper portion of the reactor, indirectly cooled and then led to a liquid-gas separator. The gas separated by the separator is decompressed to the atmospheric pressure and thereafter released into the atmosphere. On the other hand, the separated liquid phase is decompressed to the atmospheric pressure and led to a liquid-solid separator, in which the catalyst is separated from the treated liquor (pH 6.5) for recovery.

Table 7 shows the proportions of pollutants in the gas liquor before and after the treatment.

Table 7

| | Pollutants (ppm) | | |
|---|---|---|---|
| | Before treatment | After treatment | Removal (%) |
| COD | 4,000 | 9 | At least 99 |
| Total NH$_3$ | 5,000 | 4 | At least 99 |
| Nitrite nitrogen and nitrate nitrogen | 300 | 20 | 93 |
| TOD | 16,000 | 50 | At least 99 |
| TC | 2,200 | 200 | 91 |
| TOC | 1,500 | 15 | 99 |
| TN | 4,700 | 25 | At least 99 |

Note:
TOC stands for total organic carbon, the same as hereinafter.

EXAMPLE 36

The process of this invention is practiced in the mode shown in FIG. 1.

A gas liquor from a coke oven containing phenol, ammonium thiocyanate, ammonium thiosulfate, ammonium nitrite, ammonium nitrate, ammonium carbonate and ammonia is adjusted to a pH of 12.5 with a sodium hydroxide solution. The liquor is fed to a lower portion of a reactor at a space velocity of 0.99 hr$^{-1}$ (based on an empty column) and a mass velocity of 3.45 t/m$^2$.hr. Air containing 2 g/Nm$^3$ of hydrogen sulfide, 4 g/Nm$^3$ of ammonia and 0.1 g/Nm$^3$ of hydrogen cyanide is introduced into the lower portion of the reactor at a space velocity of 61.7 hr$^{-1}$ (based on an empty column, under standard conditions). The reactor is filled with a catalyst in the form of pellets 6 mm in diameter and composed of 2.0% by weight of iridium supported on alumina.

The interior of the reactor is maintained at a temperature of 265° C. and pressure of 70 kg/cm$^2$ G. The liquid-gas mixture resulting from the catalytic reaction is continuously drawn off from an upper portion of the reactor and led to a liquid-gas separator. The liquid phase separated has a pH of 6.8. The separated gas phase contains 2.5 ppm of ammonia and 0.05 ppm of nitrogen oxides, the remainder being nitrogen, oxygen and carbon dioxide. None of sulfur oxides, hydrogen sulfide and hydrogen cyanide are detected in the gas phase.

Table 8 shows the proportions of pollutants in the gas liquor before and after the treatment.

Table 8

| | Pollutants (ppm) | | |
|---|---|---|---|
| | Before treatment | After treatment | Removal (%) |
| COD | 4,000 | 5 | At least 99 |
| Total NH$_3$ | 5,000 | 2 | At least 99 |
| Nitrite nitrogen and nitrate nitrogen | 300 | 30 | 90 |
| TOD | 16,000 | 40 | At least 99 |
| TC | 2,200 | 180 | 92 |
| TOC | 1,500 | 12 | At least 99 |
| TN | 4,700 | 28 | At least 99 |

EXAMPLE 37

The process of this invention is practiced in the mode shown in FIG. 1.

A gas liquor from a coke oven and waste water obtained from the redox desulfurization process of the sulfur recovery type and separated from suspended sulfur are mixed together in a ratio of 5:1 to prepare a waste mixture, which is then adjusted to a pH of 12.5 with a sodium hydroxide solution. The mixture is fed to a lower portion of a reactor at a space velocity of 0.91 hr$^{-1}$ (based on an empty column) and a mass velocity of 4.53 ton/m$^2$.hr. On the other hand, an oxygen-containing waste gas from the regenerator (oxidation column) of the above-mentioned process containing 2.5 g/Nm$^3$ of hydrogen sulfide, 5.0 g/Nm$^3$ of ammonia, 0.1 g/Nm$^3$ of hydrogen cyanide and 16% by volume of oxygen is introduced into the lower portion of the reactor at a space velocity of 90.5 hr$^{-1}$ (based on an empty column, under standard conditions). The reactor is filled with a catalyst in the form of pellets 10 mm in diameter and composed of 2.0% by weight of ruthenium supported on alumina. The interior of the reactor is maintained at a temperature of 265° C. and pressure of 80 kg/cm$^2$G. The liquid-gas mixture resulting from the catalytic reaction is continuously drawn off from an upper portion of the reactor and led to a liquid-gas separator. The liquid phase separated has a pH of 4.5. The separated gas phase contains 15 ppm of ammonia and 0.8 ppm of nitrogen oxides, the remainder being nitrogen, oxygen and carbon dioxide. None of sulfur oxides, hydrogen sulfide and hydrogen cyanide are detected in the gas phase.

Table 9 shows the proportions of pollutants in the waste mixture before and after the treatment.

Table 9

| | Pollutants (ppm) | | |
|---|---|---|---|
| | Before treatment | After treatment | Removal (%) |
| COD | 20,000 | 145 | At least 99 |
| Total NH$_3$ | 10,000 | 25 | At least 99 |
| Nitrite nitrogen and nitrate nitrogen | 300 | 45 | 85 |
| TOD | 44,000 | 200 | At least 99 |
| TC | 2,000 | 200 | 90 |
| TOC | 1,500 | 95 | 94 |
| TN | 8,800 | 70 | At least 99 |

What we claim is:

1. A process for treating ammonia-containing waste water which comprises subjecting at a pH of at least 9 the ammonia-containing waste water to wet oxidation with an oxygen-containing gas in the presence of a catalyst while maintaining the waste water at a temperature of 100 to 370° C. and at pressure permitting the waste water to remain in the liquid phase, the catalyst being supported by a carrier and comprising at least one of iron, cobalt, nickel, ruthenium, rhodium, palladium, iridium, platinum, copper, gold, tungsten and water-insoluble compounds thereof.

2. A process as defined in claim 1 wherein the ammonia-containing waste water is subjected to wet oxidation at a pH of 10 to 12.5.

3. A process as defined in claim 1 wherein the active component of the catalyst comprises at least one of iron, cobalt, nickel, ruthenium, rhodium, palladium, iridium, platinum, copper, gold and tungsten.

4. A process as defined in claim 1 wherein the active component of the catalyst comprises at least one of water-insoluble compounds of iron, cobalt, nickel, ruthenium, rhodium, palladium, iridium, platinum, copper, gold and tungsten.

5. A process as defined in claim 4 wherein the active component of the catalyst comprises at least one of oxides of iron, cobalt, nickel, ruthenium, rhodium, palladium, iridium, copper and tungsten.

6. A process as defined in claim 5 wherein the active component of the catalyst comprises at least one of iron sesquioxide, tri-iron tetroxide, cobalt monoxide, nickel monoxide, ruthenium dioxide, rhodium sesquioxide, palladium monoxide, iridium dioxide, cupric oxide and tungsten dioxide.

7. A process as defined in claim 4 wherein the active component of the catalyst comprises at least one of ruthenium chloride and platinum chloride.

8. A process as defined in claim 4 wherein the active component of the catalyst comprises at least one of ruthenium sulfide and rhodium sulfide.

9. A process as defined in claim 1 wherein the ammonia-containing waste water is subjected to wet oxidation in a reactor of the fixed bed type.

10. A process as defined in claim 1 wherein the ammonia-containing waste water is subjected to wet oxidation in a reactor of the fluidized bed type.

11. A process as defined in claim 1 wherein the oxygen-containing gas is fed in an amount 1 to 1.5 times the required theoretical amount of oxygen.

12. A process as defined in claim 11 wherein the oxygen-containing gas is fed in an amount 1.05 to 1.2 times the required theoretical amount of oxygen.

13. A process as defined in claim 1 wherein the reaction is carried out at a temperature of 250° to 320° C.

* * * * *